United States Patent [19]

Proner et al.

[11] 3,980,189

[45] Sept. 14, 1976

[54] METHOD AND APPARATUS FOR HOMOGENIZING, STOCKPILING AND SAMPLING PARTICULATE MATERIAL

[75] Inventors: Raymond Louis Proner; Réne Léon Clément Bourgoin, both of Paris, France

[73] Assignee: Societe Anonyme: Ciments LaFarge, Paris, France

[22] Filed: Oct. 20, 1975

[21] Appl. No.: 624,403

Related U.S. Application Data

[63] Continuation-in-part of Ser. No. 370,739, June 18, 1973, Pat. No. 3,913,761.

[30] Foreign Application Priority Data

June 23, 1972 France .......................... 72.22891

[52] U.S. Cl. .................... 214/152; 214/10; 198/540
[51] Int. Cl.² ..................................... B65G 65/28
[58] Field of Search ............... 214/10, 152, 17 CB, 214/17 R, 16 R, 17 A, 17 D; 198/36, 100, 101, 76, 88, 89, 102

[56] References Cited
UNITED STATES PATENTS

| | | | |
|---|---|---|---|
| 3,233,877 | 2/1966 | Kelly | 214/10 X |
| 3,479,089 | 11/1969 | Krutein | 214/10 X |
| 3,506,146 | 4/1970 | Parigot et al. | 214/10 X |
| 3,581,920 | 6/1971 | Strocker et al. | 214/10 X |

FOREIGN PATENTS OR APPLICATIONS

| | | | |
|---|---|---|---|
| 427,093 | 3/1926 | Germany | 214/152 |
| 340,767 | 10/1959 | Switzerland | 198/101 |

*Primary Examiner*—Frank E. Werner
*Attorney, Agent, or Firm*—Berman, Aisenberg & Platt

[57] ABSTRACT

A dead heap or pile is prepared on a circular surface in the form of a sector defined by two radii of the circular surface. With respect to the median plane of the dead heap, such heap has two slopes, each with an inclination equal to that at which particulate material is retrieved from piles (on semicircular plots) which are alternately laid, first on one side and then on the other side of the dead heap. Each such pile (on a semicircular plot) is laid directly against a slope of the dead heap and is retrieved from the edge of the pile which is most remote from the dead heap.

10 Claims, 8 Drawing Figures

DEAD PILE
65°

112°
EMPTY SPACE  y  A

65°
α'
112°
EMPTY SPACE  y  A'

B  y  A

65°
α''
112°
B  y

METHOD AND APPARATUS FOR HOMOGENIZING, STOCKPILING AND SAMPLING PARTICULATE MATERIAL

RELATED APPLICATION

This application is a continuation-in-part of copending application Ser. No. 370,739 filed on June 18th, 1973, now U.S. Pat. No. 3,913,761.

BACKGROUND

Parent application Ser. No. 370,739 (filed June 18th, 1973) describes blending particulate materials in a manner which involves dropping the material in superposed layers onto a surface or area by a rotational movement about an axis and by a radial movement relative to the axis. The material is dropped onto the surface with a uniform continuous rotational movement in one direction, and preferably at a relatively high velocity, in the form of toroidal or partially toroidal masses consisting of superposed layers of juxtaposed strips, all the radial sections of which, along a plane passing through the axis of rotation, have a constant area. Retrieval is effected by suitable means in radial slices passing through a radius of the toroidal or partially toroidal mass.

According to such process the length of the radial movement is adjustable. At each increment of radial movement at which material drops, a strip is first formed on the surface and then on the strip formed by the preceding rotation, whereby a toroidal or partially toroidal mass is finally formed. The cross-sections of such mass (heap) along a plane passing through the axis of rotation are constant. Retrieval is thereafter effected by layers defined by two planes of the same inclination and passing through a common point of the axis of the toroidal or partially toroidal mass.

The rotational and radial movements (according to which material is dropped to form the heap) are controlled in order to obtain any desired distribution of strips over the surface.

To form two strips of constant section, particulate material is supplied in two parts at two drop points symmetrical to each other with respect to the axis. Constant tangential velocity and constant radial velocity (but in opposite directions) are imparted to the material for each of the points.

To form two strips of material having a constant crosssection, the material supplied is divided into two streams which are inversely proportional to the ratio of the distances of the respective drop points from the axis, the distance between the drop points being maintained constant and equal to the mean diameter; constant and equal angular velocities and constant and equal radial velocities in the same direction are established at respective drop points.

The drop points are displaced over one half the width of the toroidal section so that the material dropped forms two concentric toroidal masses offset by 180°.

Two drop points are displaced in opposite directions and symmetrically relative to a diameter in the drop plane, each drop point being fed with material at each half revolution on a trailing drop point relative to the direction of rotation.

To obtain several toroidal sections offset on the surface, a part of the material to be treated is stored for the time necessary for the interruption of the drop on at least one portion of the surface lying between two toroidal sectors and then released to be distributed by the radial movement for the formation of the heap.

Apparatus for effecting the process is characterized, among other things, by an intermediary conveyor belt (between a feed conveyor and a spout) onto which the material drops from the feed conveyor and is displaced radially by the conveyor belt during periods of drop stoppage. The conveyor belt reverses its direction of movement after a drop stoppage to restart the supply to heap-forming radial means.

When the process is put into effect with an intermediary belt, a heap is formed by a distribution of two 180° strips. Each conveyor places on the ground a 180° strip (while the other drops no material) without stopping the distribution movement.

The beginning and end of each half-strip are offset as filling proceeds, whereby the ends are positioned on a sloping plane having an inclination slightly less than that of the slope formed by the fall of material; at the opposite end, at 180°, the slope is in the opposite direction. During operation, i.e. after the first filling, a half stock is available. The ends of the halfstock have opposite-facing slopes which are cut into during retrieval.

SUMMARY OF THE INVENTION

By successively constituting half stocks of 180° in this mode of operation, a certain dead stock or heap is left; the accompanying reduction in capacity as a function of the volume and the angle of the retrieval slope is, however, advantageous, as the quality of prehomogenization is improved by the absence of bias.

The present invention relates to improvements and modifications, notably to this last form of embodiment, in order to benefit simultaneously from the absence of bias and from the totality of the active heaps.

The invention is characterized a) in forming on a surface a dead heap having, with respect to its median plane, two planes having a slope equal to that by which the material is retrieved, and the material of which is (in the preferred embodiment) never retrieved, b) in alternately constituting, on either side of the dead heap, an active heap of 180°, c) in bearing one of the ends of each of the active heaps on one side of the dead heap and d) in effecting retrieval from the other end of each of the active heaps, the active heaps alternately taking upon the ground a common angle opposite to the angle of the dead heap.

The equipment is, e.g., simplified by omitting the intermediate stocking belt of the parent application Ser. No. 370,739 and providing a tonnage independent of the volume of the dead heap.

The fixed dead heap is formed on the surface, e.g., before any "filling" operation; it may be constructed manually or mechanically be depositing materials similar to or dissimilar from those of the mixture which is to be homogenized according to the invention; an assembly of parts forming a sloped sector and with an angle at the center corresponding to the characteristics required of the dead heap may be mounted on the surface or again, while the prehomogenization surface is being established, a volume forming the dead heap may be reserved in the excavation. Generally speaking, the central angle ($\alpha$) of the dead heap is preferably in the range of about 70° to about 40°, as a function of the total tonnage to be treated and the capacity of the mechanical equipment.

According to the invention, when a first active heap is constituted over 180°, retrieval is started at the free end of said heap, the formation of the second active heap is then started over 180° while continuing retrieval of the first heap.

Homogenizing, stockpiling and sampling particulate material is effected by dropping the particulate material in superposed layers on a surface or area by a movement of rotation about an axis and by a radial movement from the axis (by uniform and continuous rotation in one direction and preferably at a relatively high velocity) in the form of a toroidal mass or torus consisting of superimposed layers of juxtaposed strips. Radial sections of the torus formed by passing planes through the axis of rotation reveal a constant surface. After the particulate material is dropped, it is retrieved in radial slices by any known suitable means, radial movement being controllable and adjustable.

The particulate material is supplied in two portions and at two drop points positioned symmetrically with respect to the axis. A constant tangential velocity and a constant radial velocity are imparted to the particulate material at each drop point, but the respective velocities at one drop point are in the opposite directions from those at the other drop point. The radial movement is adjustable. The drop points are moved along the width of the torus section, the front ends and lead ends of each half strip are offset as filling progresses so as to be positioned in an inclined plane having a slope slightly less than the dropping slope and the opposite ends (180° removed therefrom), in an inclined plane having a slope which is the reverse thereof.

The surface on which the particulate material is dropped is effectively a circular surface minus a sector occupied by a dead heap. The dead heap has, with respect to its median plane, a slope equal to that at which retrieval is effected and is constituted by material which, according to the preferred embodiment is never retrieved. An active heap (extending over 180°) is preferably formed first on one side and then on the other side of the dead heap. One end of alternate active heaps bears on one side of the dead heap; one end of remaining active heaps bears on the other side of the dead heap. The active heaps are retrieved from the end thereof which is remote from the dead heap. The slope (adjacent to the dead heap) of each active heap is the reverse or complement of the slope of the dead heap which it bears upon; the other or free slope of each active heap is the same as the slope of the dead heap which the other end of the active heap bears upon.

DRAWINGS

DEFINITIONS

Throughout the specification and claims the following terms are used according to the noted meanings:

$\alpha$ - The angle formed by the two radii which define sides of the sector occupied by the dead heap, i.e. the central angle of the dead heap.

$\alpha'$ - An angle equal to $\alpha$ and defined by extending (through the center of the circle) the radii which form the sides of the sector occupied by the dead heap.

Active Heap - A heap of particulate material deposited on and later retrieved from a surface.

Bias - Deviation of the composition of the stock.

Dead Heap - A volume of material in the form of a solid, particulate or composite mass which occupies a sector of a circular area.

Homogenizing - Mixing particulate material to obtain an essentially homogenous mass.

Median Plane - A plane which bisects the angle formed by the two radii which define sides of the sector occupied by the dead heap.

Relatively High Velocity - Preferably from 0.5 to 2 turns per minute for the rotational velocity of the drop points.

Sector - A portion of an essentially circular area defined by two radii of the circular area.

Toroidal - This term is used throughout the disclosure and claims in a manner which includes partially toroidal, i.e. a toroid which is bound by two planes which intersect at the center of curvature for the toroid. The toroidal masses which are laid thus extend over only 180°, rather than the 360° which would define a complete toroid.

Torus - Includes a partial torus. Cf. definition of "toroidal."

DETAILS

Figure 1:
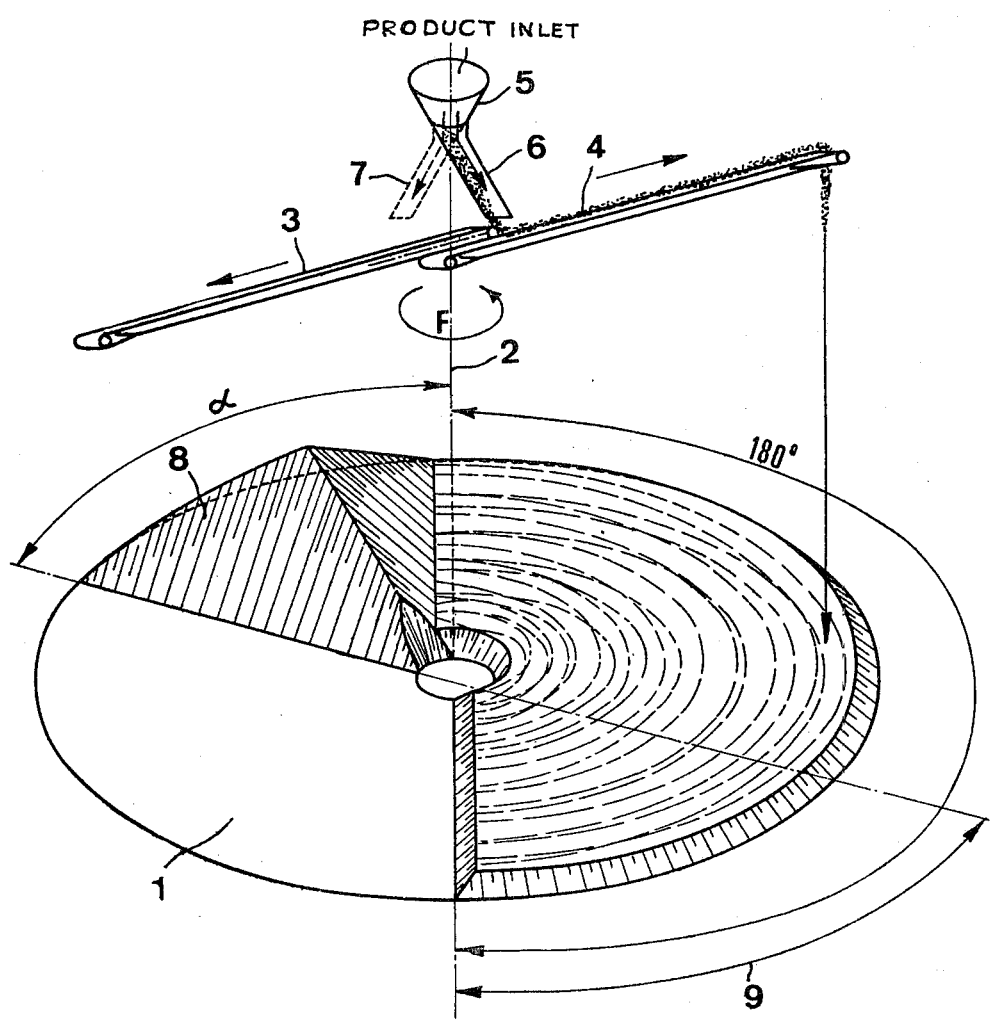
FIG. 1 is a schematic representation of apparatus for putting the invention into effect.

The entire disclosure (including text and drawings) of parent application Ser. No. 370,739 (filed June 18th, 1973) is incorporated herein by reference. With reference to the drawings of the present application, FIG. 1 shows surface 1, axis of rotation 2 in continuous rotation according to arrow F, radial drop half areas 3 and 4 positioned opposite each other and hopper 5 with material feeders 6 and 7. The fixed dead heap 8 covers a sector of angle $\alpha$; the opposites angle 9 ($\alpha'$) of said "dead heap" sector corresponding to an alternately filled surface on the surface. The radial planes bounding said angle 9 are those wherein the inversions of drop (from arm 3, then from arm 4, respectively) occur, forming the two active heaps.

Figure 2:
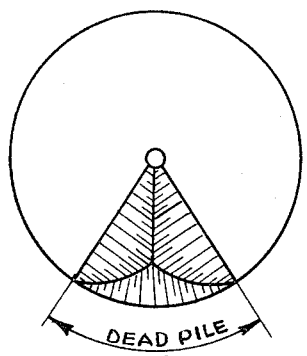
FIGS. 2 to 6 represent a mode of operation of the invention over a period of eight days.
Figure 3:
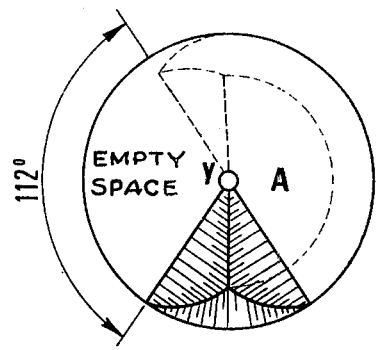
Figure 4:
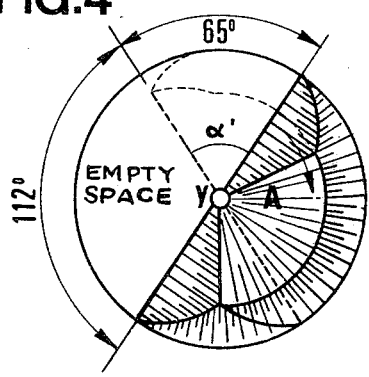
Figure 5:
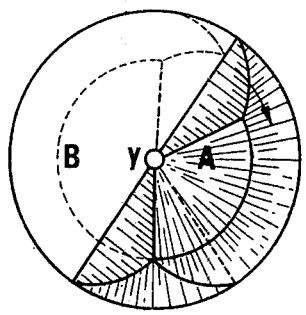
Figure 6:
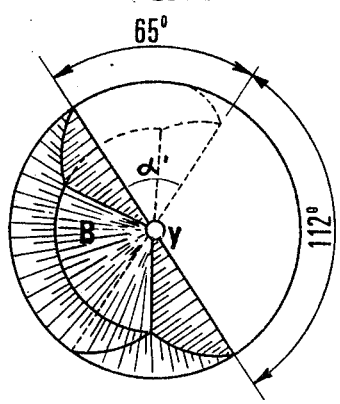

In the examples of FIGS. 2 to 6, the dead heap, obtained on the surface by any suitable means, corresponds to an angle of 65° at the center, its outer slopes are inclined at the angle at which the material falls; FIG. 2 therefore represents the starting position of prehomogenization operation. Assuming that it is desired to treat about 15,000 tons of material, the apparatus of FIG. 1 is operated from 8 a.m. Monday until 4 p.m. Friday to build the active heap on an angle with a center of 180° from a slope (to the right of the drawing) of the dead heap (FIG. 3); retrieval is effected from 4 p.m. Friday to 8 a.m. Monday (over the week-end) so as to clear (FIG. 4) angle $\alpha$, i.e. a sector of about 65° of the first heap; from the following Monday (8 a.m.) to the second Friday (4 p.m.), the second active heap B (FIG. 5) is filled starting from the slope (left) of the dead pile; from 4 p.m. on the second Friday until 8 a.m. on the third Monday the portion $\alpha$ of the second head B (FIG. 6) is retrieved, and the filling operations are continued (2nd heap A') from 8 a.m. on said third Monday.

Figure 7:
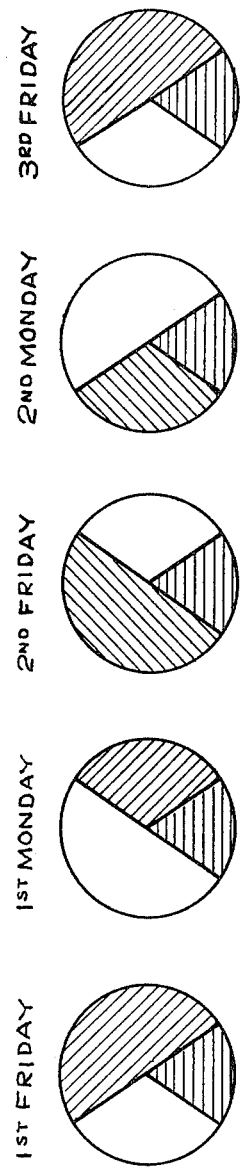
FIG. 7 shows successive steps for covering the surface.

FIG. 7 shows a top view of the active filling situations according to FIGS. 2 to 6.

In these various operation, the filling controls, advantageously ensured by an ordinator mounted on the revolving drop device, are such that successively deposited strips start exactly on the plane of inclination of the dead heap, and that the strips end automatically on the plane offset by 180° with respect to the plane of inclination; the scraper used for retrieval being inclined along the same plane and therefore simultaneously removing the same portion of all the strips, without an "end of heap" error being possible.

The efficiency factor of a prehomogenization step is characterized by the ratio between the standard deviation of the material composition at feeding and their standard deviation at the outlet. Said factor is a function of the number of strips deposited according to an exponential law; a large number of strips is therefore very advantageous, all the more so as it enables one truck load (taken as the smallest unit of variation of a quarry) to be deposited on at least the length of the heap. This means that every truck is represented in all the sectors of the heap. To be constant throughout the heap, the efficiency factor necessitates the strips not being deformed at the ends by slowing down due to a reversal of direction (the case of straight line prehomogenization). Prehomogenization according to parent application Ser. No. 370,739 and according to the present invention makes it possible, owing to the continuous rotational movement of the drops, to impart thereto a high tangential velocity resulting in a very large number of strips which could not be attained by a reversed linear movement. Said continuous rotational movement making it possible to deposit the strips such that prehomogenization occurs without any deformation at the end of the heap. All of these advantages are acquired under the best conditions by prehomogenization according to the invention.

A practical example of prehomogenization of 15,000 tons of material - corresponding to the requirements of a cement factory of 1200 tons/day - consists of, e.g.:
2400 strips deposited in
115 layers. The efficiency factor is 360
For a factory using limestone with a 95 percent carbonate content and clays titering 15 percent (extreme conditions),
- the input standard deviation is : 33.45
- the output standard deviation will be : 0.093

This means that in 95 percent of the cases the variations of titer at the prehomogenization output will not be greater than 0.2 point, which is suitable for direct use of the mixture, and is less than the precision of the titering analysis.

To increase the polar prehomogenization capacity described, it is only necessary to increase the frequency of the filling:retrieval cycles by accelerating these operations within the limits of the capacity of the handling apparatus.

In the normal operation an active heap (extending over a course of less then the area of a circular surface that is not covered by the dead heap, preferably 180°) is laid starting from one side, e.g. the right side, of the dead heap. Every strip of this first active heap is laid counterclockwise until the heap is complete. After the active heap has been formed, it is retrieved clockwise in radial slices starting at the edge of the heap which is most remote from the edge of the dead heap against which the active heap was laid. When (or as soon after as is practical) retrieval has been sufficient to permit laying a similar (extending over a course of 180°) active heap against the left side of the dead heap, the laying of such a heap is initiated in a clockwise direction and continued in that direction until complete. The building up of the second active heap is effected while the remainder of the first active heap is being retrieved.

As soon as the second active heap is completed, its retrieval can be initiated in a counterclockwise direction, again starting at the edge of the second active heap which is most remote from the edge of the dead heap against which the second active heap was laid. Similarly, when retrieval has been sufficient to permit laying a further active heap in the same position as the first active heap, such is initiated in a counterclockwise direction and continued while retrieval of the second active heap is being completed.

Alternately laying and retrieving active heaps, first on one side and then on the other of the dead heap, is continued until all of the particulate material to be homogenized has been processed.

In a variation of this operation in which the dead heap is first formed from the particulate stock which is being homogenized, a change occurs, e.g., in the retrieval of the first active heap. Although this active heap extended over 180°, retrieval is shortened by an increment of, e.g., ten degrees. Likewise, retrieval of the second active heap is increased by a similar increment. Repeating these operations (retrieving less from the odd-numbered active heaps and more from the even-numbered active heaps) results in a continuous counterclockwise shift of the dead heap and a slightly different constitution of the resulting mixture.

The present invention is an improvement based on the invention disclosed in parent application Ser. No. 370,739 (filed June 18th, 1973). The invention and its advantages are readily understood and appreciated from the foregoing description and accompanying drawings. Various changes may be made in the process without departing from the spirit and scope of the invention or sacrificing its material advantages. For example, an additional increment may be retrieved from alternate active heaps (without shortening the retrieval from any active heaps) in such a way as to eliminate the dead heap entirely at the completion of the homogenizing operation. In any event the previously-described processes are merely illustrative of the invention.

Figure 8:
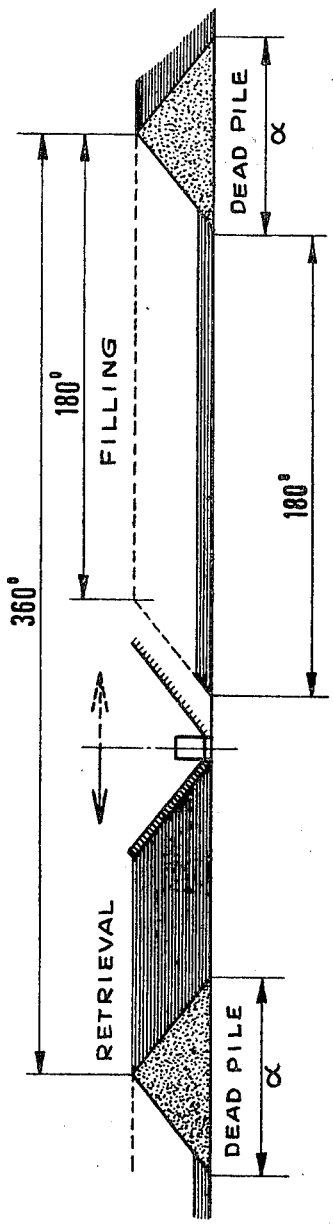
FIG. 8 is a developed cross sectional view of heaps.

Notwithstanding the virtually unlimited possible variants, the preferred operation and that which has yielded the most homogeneous product includes the following features:

a. forming a semi-circular pile according to FIGS. 1 and 8; providing essentially vertical growth of the pile; always rotating the distributor in the same direction and at the same speed during the formation of a particular pile; and retrieving each semi-circular pile in the direction of the dead pile, starting at the opposite side;

b. maintaining the dead pile so that it does not shift in position or stature, thus providing for greater homogeneity and economy of surface;

c. imparting radial motion to conveyors 3 and 4 [FIG. 1] in order to form distinct strips; reducing the amplitude of such motion as the height of the pile increases in order to reproduce the natural slope on the internal and external sides of the pile; and d. maintaining a rotational velocity of the drop points at from 0.5 to 2 turns per minute and a radial velocity of the drop points at from 0.5 to 1 meter per minute.

What is claimed is:

1. A process for increasing the homogeneity of particulate material which is not completely homogeneous which comprises:
   a. forming a dead heap over a sector of an essentially circular area, the dead heap having a base, a height and sloping sides the slopes of which are approximately equal, but in opposite directions;
   b. forming a first active heap by dropping the particulate material in superposed layers of juxtaposed strips over a portion of a circular surface extending from and including one side of the dead heap, the portion being less than that which is not occupied by the dead heap, successive juxtaposed strips being radially displaced, all strips and all layers being laid in the same direction and having one end touching one side of the dead heap and the other end being free and having a slope which approximates the slope of the dead heap which the strips and layers touch;
   c. retrieving radial slices from the free end of the first active heap, the slices being in successive planes which have slopes approximating that of the dead heap which the strips and layers touch;
   d. when sufficient radial slices have been retrieved to free a portion of the circular surface, not occupied by the dead heap, which is approximately equivalent in size to that occupied by the entire first active heap, forming a second active heap by dropping the particulate material in superposed layers of juxtaposed strips over a portion of the circular surface essentially equal to that formerly occupied by the entire first active heap and extending from the side of the dead heap which was not touched by the first active heap, successive juxtaposed strips being radially displaced, all strips and all layers being laid in the same direction and having one end touching the side of the dead heap which was not touched by the first active heap and the other end being free and having a slope which approximates that of the dead heap which the strips and layers touch, the direction in which the strips and layers are laid being the same as or opposite from that employed in forming the first active heap;
   e. retrieving radial slices from the free end of the second active heap, the slices being in successive planes which have slopes approximately that of the dead heap which the strips and layers touch;
   f. sequentially repeating steps (b), (c), (d) and (e) until all of said particulate material is exhausted and at least approximately all but that reserved for the dead heap is retrieved.

2. A process according to claim 1 which comprises a) dropping the particulate material is superposed layers on a surface by a movement of rotation about an axis and by a radial movement with respect to the axis, the rotation being uniform, continuous and in one direction, to form a composite toroidal mass or torus consisting of superposed layers of juxtaposed strips; all radial sections, by planes passing through the axis of rotation, of the toroidal mass having a constant surface; b) retrieving radial slices from the toroidal mass in a direction opposite that in which said mass was formed; c) dividing the particulate material into two portions and delivering each portion to a different one of two drop points positioned symmetrically with respect to the axis; d) imparting a constant tangential velocity and a constant radial velocity to the material at each drop point, the respective velocities at one drop point being opposite in direction to those at the other drop point; e) moving the drop points along the width of the torus, offsetting the front ends and lead ends of each strip as dropping progresses, thus positioning the ends in an inclined plane having a slope slightly less than the dropping slope.

3. A process according to claim 2 which comprises forming each active heap over 180° of the circular surface.

4. A process according to claim 3 which comprises forming the dead heap prior to dropping the particulate material.

5. A process according to claim 3 which comprises forming the dead heap on a sector of the circular area so that each of the two sides which meet at the center of the circular area has a slope, with respect to a median plane passing through the sector and the center of the circular area, equal to that at which retrieval is effected, the dead heap being constituted by material which is not retrieved when retrieving radial slices.

6. A process according to claim 3 which comprises forming the dead heap by leaving a volume, corresponding to the shape of the dead heap, in position when preparing the essentially circular area.

7. A process according to claim 3 wherein the dead heap is in the form of a sector having a central angle in the range of from 40° to 70°.

8. A process according to claim 3 which comprises essentially completely retrieving each active heap before another active heap is deposited in the same direction over essentially the same area.

9. A process according to claim 1 which comprises dropping all particulate material in the same rotational direction when forming active heaps.

10. A process according in claim 1 which comprises dropping particulate material in opposite rotational directions when forming alternate active heaps.

* * * * *